United States Patent
Osakabe

(10) Patent No.: US 11,738,576 B2
(45) Date of Patent: Aug. 29, 2023

(54) PRINTING DEVICE AND NAIL POSTURE CONFIRMATION METHOD

(71) Applicant: CASIO COMPUTER CO., LTD., Tokyo (JP)

(72) Inventor: Fumihiro Osakabe, Akishima (JP)

(73) Assignee: CASIO COMPUTER CO., LTD., Tokyo (JP)

(*) Notice: Subject to any disclaimer, the term of this patent is extended or adjusted under 35 U.S.C. 154(b) by 146 days.

(21) Appl. No.: 17/476,318

(22) Filed: Sep. 15, 2021

(65) Prior Publication Data

US 2022/0087394 A1     Mar. 24, 2022

(30) Foreign Application Priority Data

Sep. 18, 2020   (JP) ................. 2020-156830

(51) Int. Cl.
    *B41J 29/393*     (2006.01)
    *B41J 11/00*     (2006.01)
    *G06T 7/70*     (2017.01)
    *B41J 3/46*     (2006.01)
    *B41J 3/407*     (2006.01)
    *H04N 7/18*     (2006.01)

(52) U.S. Cl.
CPC ....... *B41J 11/0095* (2013.01); *B41J 3/40731* (2020.08); *B41J 3/46* (2013.01); *G06T 7/70* (2017.01); *B41J 2203/011* (2020.08); *G06T 2207/30196* (2013.01); *H04N 7/18* (2013.01)

(58) Field of Classification Search
CPC .... B41J 29/393; B41J 3/4073; B41J 3/40731; B41J 3/40733; B41J 11/003; B41J 2203/01; B41J 2203/011

USPC .......................................................... 347/19
See application file for complete search history.

(56) References Cited

U.S. PATENT DOCUMENTS 6,286,517 B1 *   9/2001   Weber .................... A45D 34/04
                                                                    132/73

FOREIGN PATENT DOCUMENTS

| JP | 2003-534083 A | | 11/2003 | |
|---|---|---|---|---|
| JP | 2014-121344 A | | 7/2014 | |
| JP | 2020-103448 A | | 7/2020 | |
| KR | 20090002713 A | * | 1/2009 | ............ B41J 29/393 |
| WO | 01/91598 A1 | | 12/2001 | |
| WO | WO-2005120285 A1 | * | 12/2005 | ............ A45D 29/00 |
| WO | 2020/110351 A1 | | 6/2020 | |

OTHER PUBLICATIONS

JPO; Application No. 2020-156830; Notice of Reasons for Refusal dated Aug. 23, 2022.

* cited by examiner

*Primary Examiner* — Julian D Huffman
(74) *Attorney, Agent, or Firm* — Fitch, Even, Tabin & Flannery LLP

(57) ABSTRACT

Disclosed is a printing device including: a finger stage on which a finger corresponding to a nail is placed, the nail being a printing target; a carriage which has at least one reflector; and a camera which obtains at least an image of the nail of the finger placed on the finger stage from an upper direction and an image of the nail of the finger reflected in the reflector.

16 Claims, 11 Drawing Sheets

PRINTING DEVICE AND NAIL POSTURE CONFIRMATION METHOD

CROSS-REFERENCE TO RELATED APPLICATION

The present application is based upon and claims the benefit of priority from the prior Japanese Patent Application No. 2020-156830, filed on Sep. 18, 2020, the disclosure of which, including descriptions, claims, abstracts and drawings, is incorporated herein by reference in its entirety.

BACKGROUND

Technical Field

The present disclosure relates to a printing device and a nail posture confirmation method.

Background Art

Conventionally, there are known printing devices (nail printing devices) that print nail designs (performs nail printing) on fingernails, toenails and the like.

For example, JP 2003-534083 A discloses a printing device that prints nail designs on the nails by an inkjet method.

In the case of performing nail printing with a printing device in such a way, high-grade and high-definition printing cannot be performed if the nail is not placed in a correct posture at a correct position.

On this respect, JP 2003-534083 A describes providing a finger holder ("holder" in JP 2003-534083 A) to place the finger.

SUMMARY

According to an aspect of the present disclosure, there is provided a printing device including: a finger stage on which a finger corresponding to a nail is placed, the nail being a printing target; a carriage which has at least one reflector; and a camera which obtains at least an image of the nail of the finger placed on the finger stage from an upper direction and an image of the nail of the finger reflected in the reflector.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DESCRIPTION OF EMBODIMENTS

An embodiment of a printing device and a nail posture confirmation method according to the present disclosure will be described with reference to FIGS. 1 to 18.

The embodiment described below is provided with various limitations technically preferable for carrying out the present disclosure. However, the scope of the present disclosure is not limited to the embodiment below or illustrated examples.

Furthermore, in the following embodiment, a case where the printing device is a nail printing device that performs printing on fingernail(s) (including thumbnail(s)) of hand(s) as a printing target will be described as an example. However, the printing target of the printing device in the present disclosure is not limited to the fingernail(s) or the thumbnail(s) of hand(s). For example, toenail(s) of foot (feet) may be the printing target.

Figure 1:
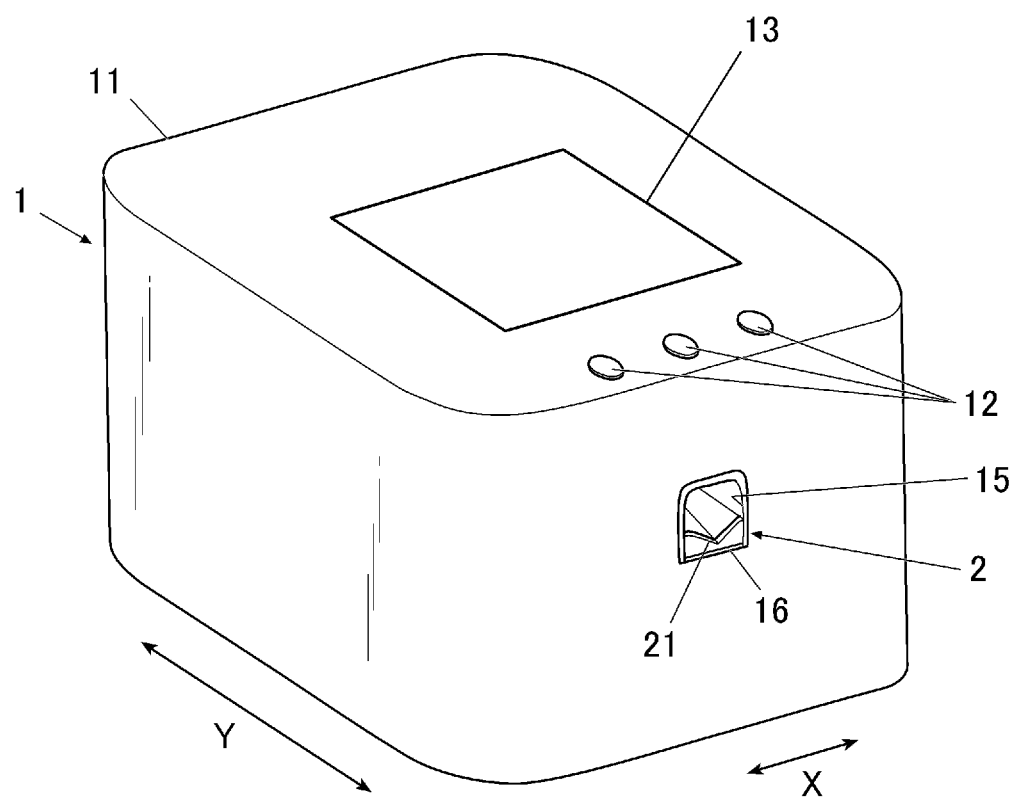
FIG. 1 is a view showing the schematic configuration of a printing device in an embodiment.
Figure 1:
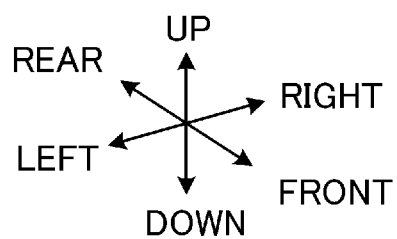
Figure 2:
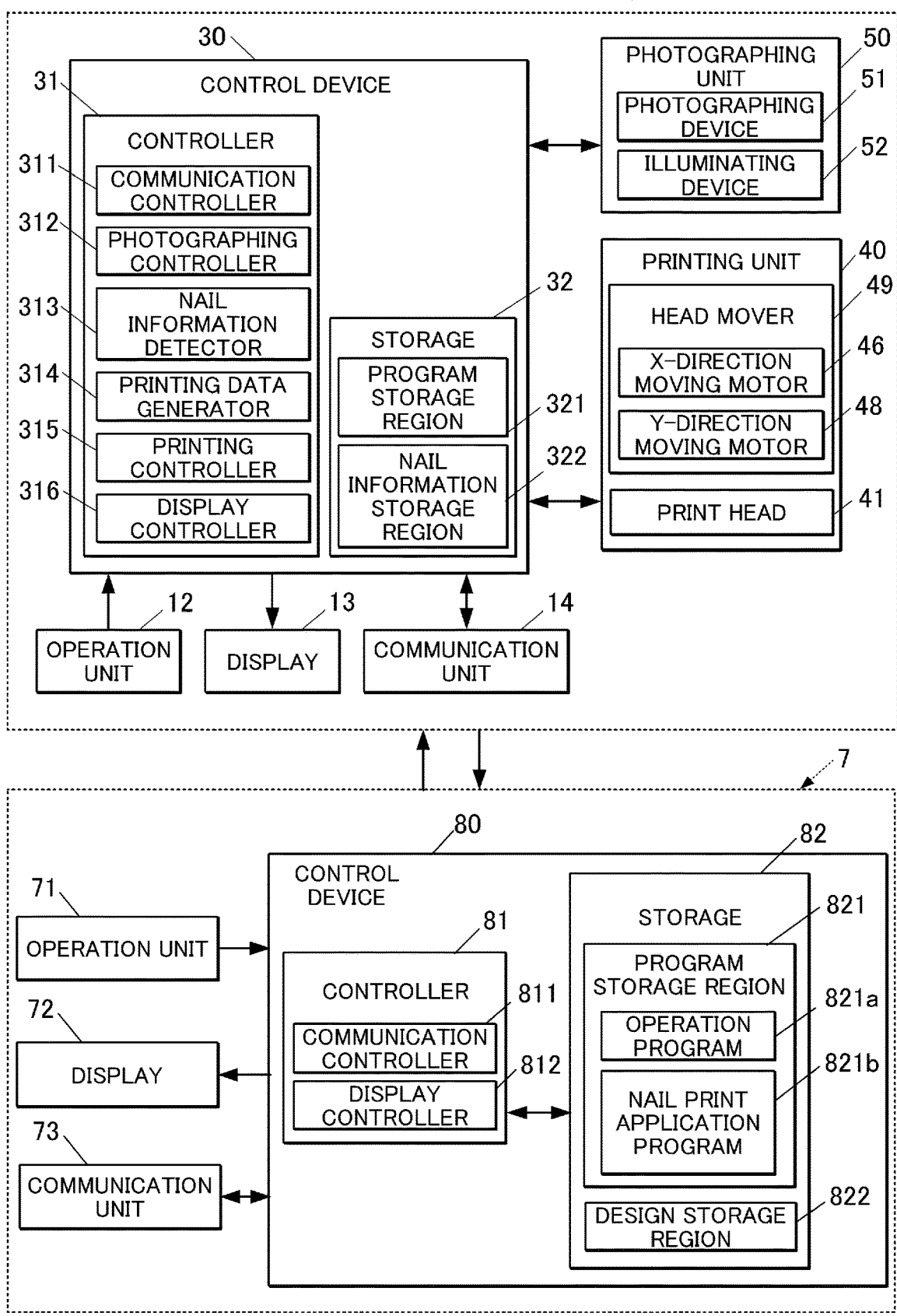
FIG. 2 is a main part block diagram showing the control configuration of the printing device and a terminal device that cooperates with the printing device in the embodiment.

FIG. 1 is a perspective view showing the outer appearance of the printing device (nail printing device) in the present embodiment. The embodiment takes, as an example, a case where the printing device performs printing on the nail in cooperation with a terminal device. FIG. 2 is a block diagram showing the control configuration of main parts in the printing device and the terminal device that cooperates with the printing device in the embodiment.

In the following embodiment, the up and down, the left and right, and the front and rear are referred to as those shown in FIG. 1. The X direction and Y direction are referred to as those shown in FIG. 1.

The printing device 1 in the present embodiment includes a housing 11 which is formed in a substantially box shape, as shown in FIG. 1.

An operation unit 12 is set on the upper surface (top plate) of the housing 11.

The operation unit 12 is an operation unit for the user to perform various types of input.

The operation unit 12 is configured by including operation buttons for performing various types of input such as a power switch button to turn on the printing device 1, a stop switch button to stop the operation, and a printing start button to instruct to start printing, for example.

When the operation unit 12 is operated, an operation signal according to the operation is output to a control device 30, and the control device 30 performs control according to the operation signal, to operate the components of the printing device 1.

The components in the printing device 1 may be operated in accordance with an operation signal that is input from an operation unit 71 of a terminal device 7 to be described later instead of the operation unit 12.

A display 13 is provided on the upper surface (top plate) of the housing 11.

The display 13 is configured by including a liquid crystal display (LCD), an organic electroluminescence display (organic ELD) or other flat displays, for example.

A touch panel for performing various types of input may be integrally formed with the surface of the display 13. In this case, the touch panel functions as the operation unit 12.

As mentioned later, a nail information detector 313 detects a posture state of a nail T in the present embodiment. In the case where the detected posture state of the nail T is not within the allowable range, it may be indicated on the display screen of the display 13 to notify the user, or a message or the like urging the user to correct the posture state of the nail T may be displayed.

In this case, the display 13 functions as a notifier that notifies the user of various types of states, and the like.

The display 13 may display nail designs input or selected from the operation unit 12 or the like by the user, various types of guide screens, warning display screens and the like, as needed.

The printing device 1 includes a communication unit 14 (see FIG. 2). The communication unit 14 is configured to be able to transmit and receive information to and from the terminal device 7.

The communication between the printing device 1 and the terminal device 7 is performed by a wireless LAN, for example. The communication between the printing device 1 and the terminal device 7 is not limited to this, and the communication may be performed by any method. The communication unit 14 includes an antenna chip corresponding to the communication type of the terminal device 7.

The communication unit 14 is connected to a communication controller 311 (see FIG. 2) of the control device 30, and controlled by the communication controller 311.

A finger inserting port 15 that is an opening to insert the finger at the time of printing by the printing device 1 is formed on the front surface side (front side in the Y direction in FIG. 1) of the housing 11 of the printing device 1.

A finger holder 2 (finger stage) to place and hold the inserted finger U during printing is formed inside the finger inserting port 15. The finger holder 2 holds the finger U corresponding to the nail T that is the printing target by a printing unit 40.

The inside of the housing 11 is vertically divided by a dividing plate 16, and the finger holder 2 is provided at a position corresponding to the finger inserting port 15 on the upper side of the dividing plate 16.

Figure 3:
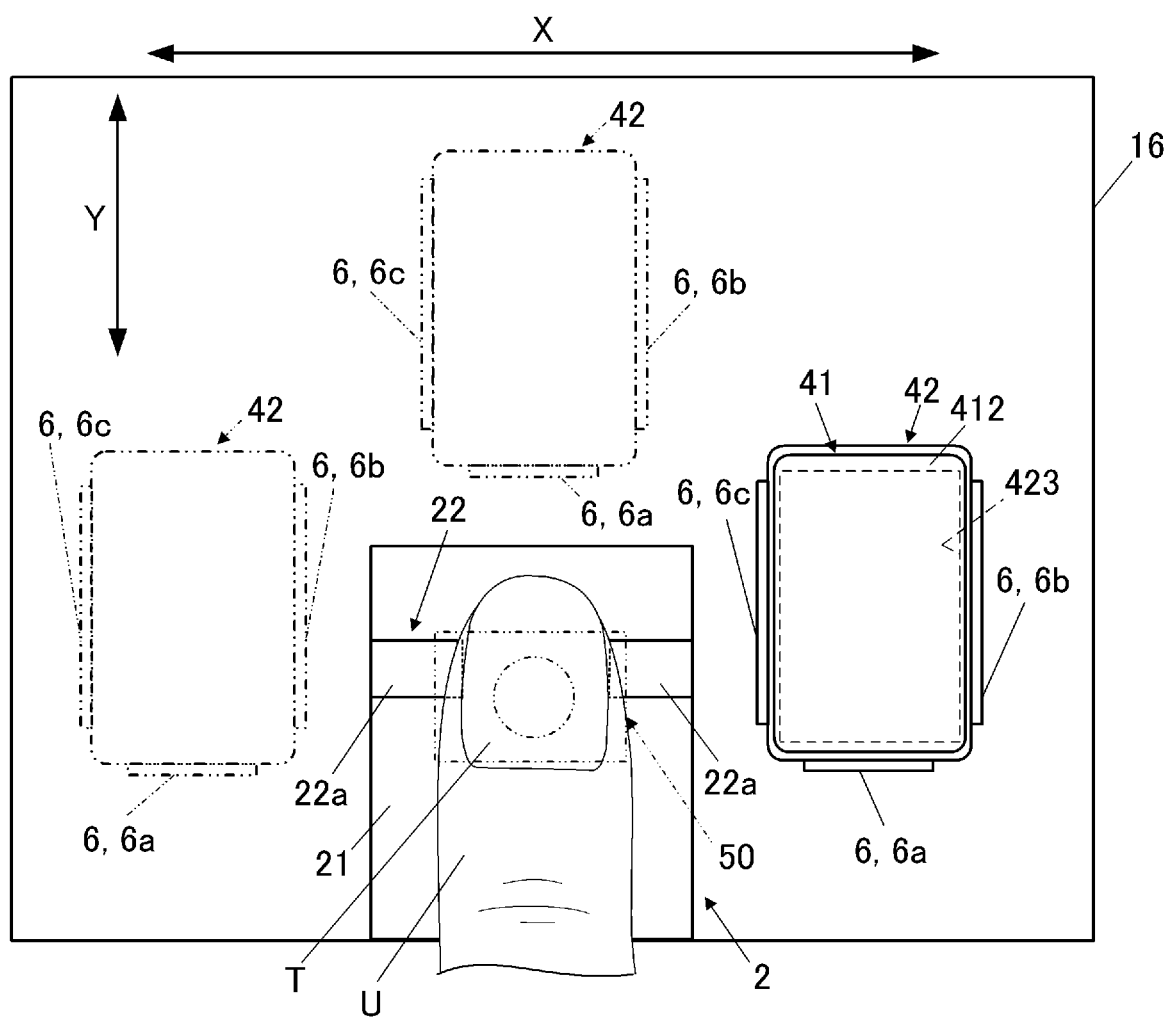
FIG. 3 is a plan view schematically showing the arrangement of a finger holder and a head holder to which reflecting members are provided, on a dividing plate of the printing device.

FIG. 3 is a schematically plan view of the upper surface of the dividing plate inside the housing, seen from above. As mentioned later, the reflecting member 6 in the present embodiment is attached with an angle to each outer surface of a holder body 421 of a head holder 42. FIG. 3 schematically illustrates each reflecting member 6 so as to be parallel to the outer surface of the holder body 421.

As shown in FIG. 3, the finger holder 2 is disposed in the substantially central portion in the left-right direction (X direction in FIGS. 1 and 3) of the device on the front side in the front-rear direction (Y direction in FIGS. 1 and 3) of the device on the dividing plate 16.

The finger holder 2 in the embodiment includes a finger supporting member 21 and a fingertip placing unit 22.

The finger supporting member 21 supports from the lower side the finger U inserted from the finger inserting port 15, and the finger supporting member 21 is formed of a resin having a flexibility, for example.

Figure 6:
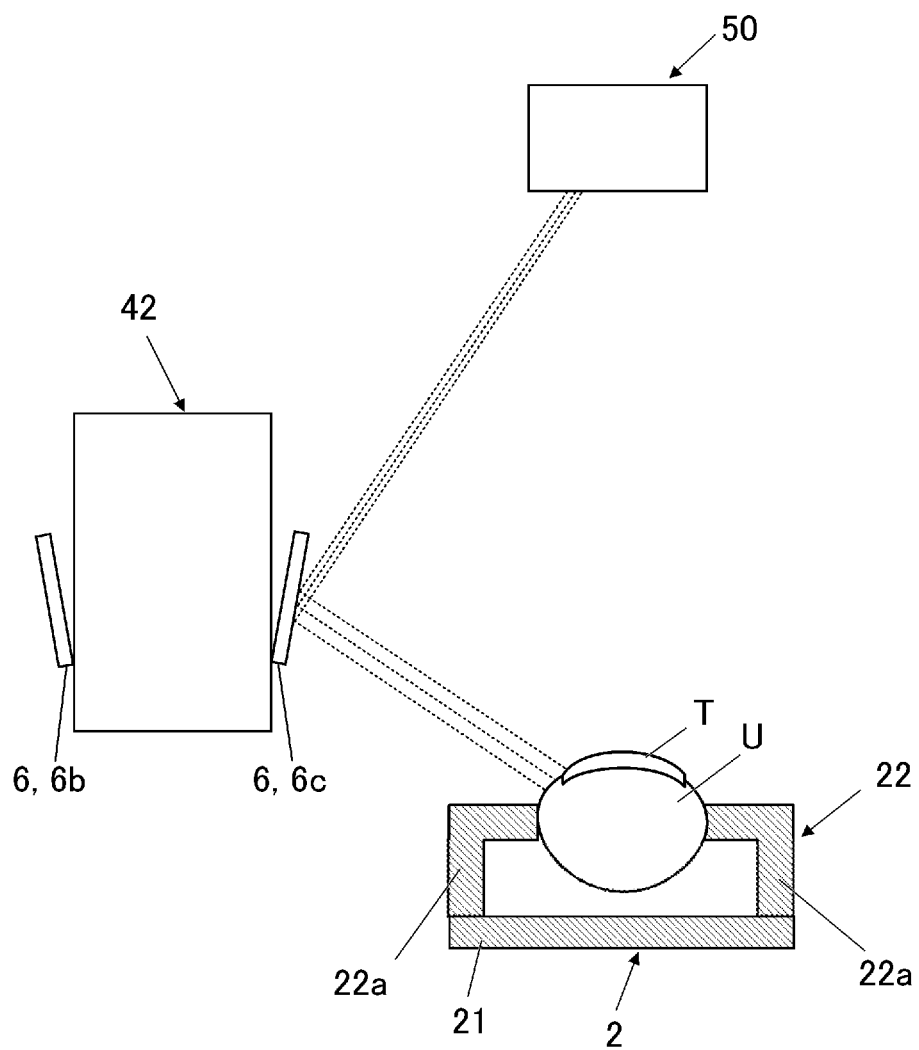
FIG. 6 is an explanatory view schematically showing the positional relationship between the finger holder, the head holder having the reflecting members and a photographing unit in the case of obtaining a right side lateral image of a nail.
Figure 9:
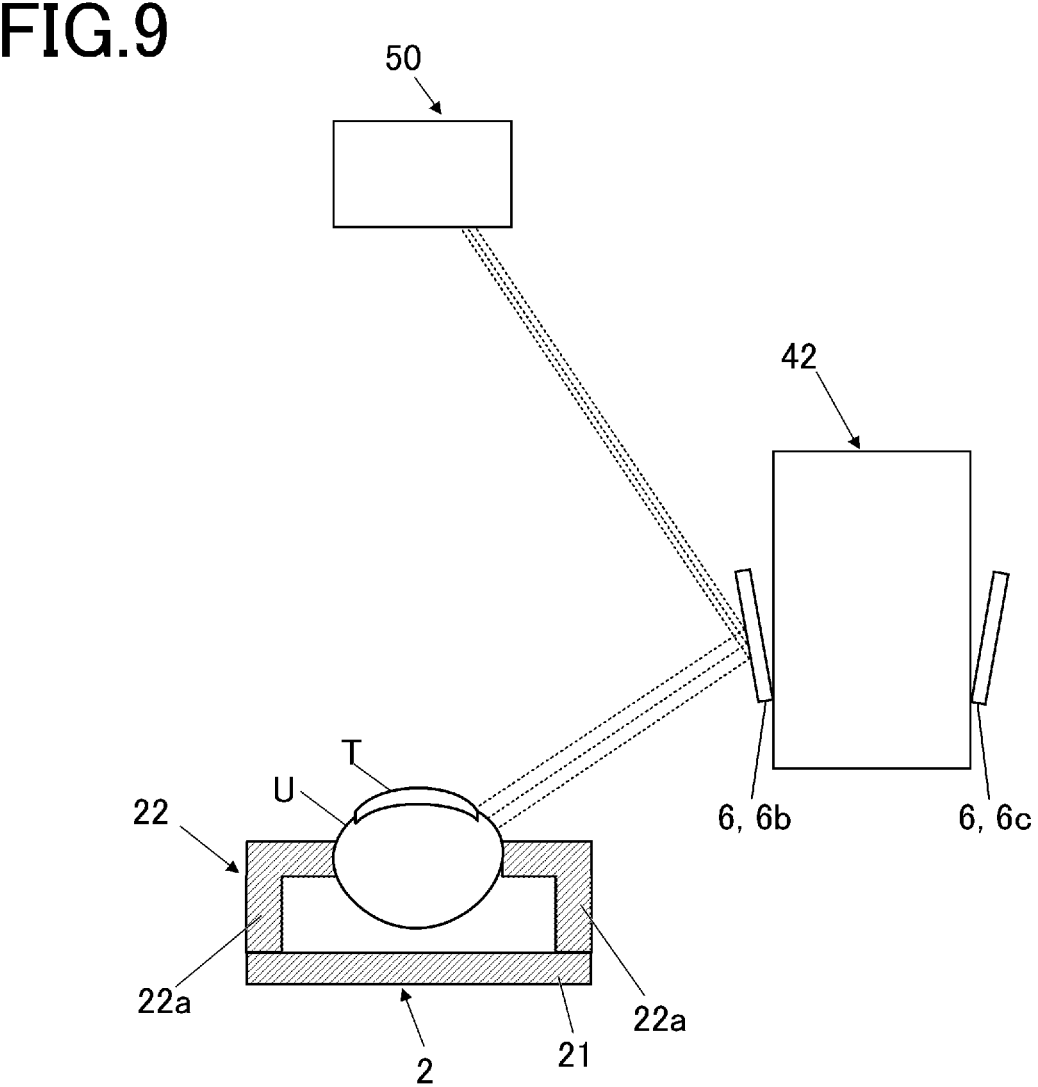
FIG. 9 is an explanatory view schematically showing the positional relationship between the finger holder, the head holder having the reflecting members and the photographing unit in the case of obtaining a left side lateral image of a nail.

The fingertip placing unit 22 is disposed on the fingertip side (back side in the Y direction) of the finger supporting member 21 as shown in FIG. 3, and supports the tip side of the finger U so as to nip the tip side from the left and right in the X direction. To be specific, as shown in FIGS. 3, 6 and 9, for example, the fingertip placing unit 22 is obtained by cutting off a part (central portion in the X direction) of a frame portion provided to stand over the X direction (X direction in FIG. 3, width direction of the finger supporting member 21) on the upper surface of the finger supporting member 21, to be a pair of left and right standing portions 22a each in a substantial L-shape. The fingertip placing unit 22 allows the fingertip portion to be placed in a gap that is formed between the pair of standing portions 22a.

The specific shape of the fingertip placing unit 22 is not particularly limited, but the nail T and the finger U can be placed on the fingertip placing unit 22 in a state in which the upper surface of the nail T is exposed. Particularly in the present embodiment, images from a lateral side of the finger U and the nail T and from the tip side of the finger U and the nail T are obtained as mentioned later. Thus, the fingertip placing unit 22 is formed in such a shape that the lateral sides and the tip side (fingertip side) of the finger U and the nail T are not blocked (see FIGS. 3, 6 and 9, for example).

The pair of standing portions 22a may be configured to be automatically or manually movable in the X direction so that the gap formed between the standing portions 22a can be expanded and contracted. In such a configuration, it is possible to adjust the gap of the fingertip placing unit 22 according to the size (thickness or the like) of the finger U to be held by the finger holder 2, which enables placement at an appropriate position in both of the case where the user's finger U is thin and the case where the user's finger U is thick.

The printing unit 40 that performs printing on the nail T (surface of the nail T) of the finger U, the photographing unit 50 that obtains images of the finger U including the nail T, and the like are provided inside the housing 11.

The photographing unit 50 obtains images of the finger U and the nail T held by the finger holder 2 and includes a photographing device 51 and an illuminating device 52 as shown in FIG. 2.

The photographing device 51 is, for example, a small-sized camera configured by including a solid imaging element which has approximately two million pixels or more and a lens. The illuminating device 52 is an illuminating lamp of a white LED, for example.

The photographing unit 50 illuminates the nail T of the finger U placed on the finger holder 2 with the illuminating device 52. The photographing unit 50 photographs the finger U with the photographing device 51, and obtains the nail images (images of the finger U including the nail T) that are images of the nail T of the finger U.

The photographing unit 50 may be provided at any position capable of photographing the finger U held by the finger holder 2, and the specific position is not particularly limited. In the present embodiment, the photographing device 51 and the illuminating device 52 are arranged to be fixed at a position on the inner side of the top surface of the housing 11, the position facing the nail T (surface of the nail T) of the finger U held by the finger holder 2 and being able to photograph the upper surface of the nail T.

The photographing unit 50 in the present embodiment is able to photograph at least the lateral images from the lateral sides and the front image from the fingertip side for the finger U and the nail T held by the finger holder 2 by movement of the reflecting members 6 in the X and Y directions as mentioned later.

The photographing unit 50 is not limited to a photographing unit that photographs a still image. The photographing unit 50 may be able to take a moving image that can be displayed as live view display on the display 13, a display 72 to be mentioned later of the terminal device 7, and/or the like.

The photographing unit 50 is connected to the photographing controller 312 (see FIG. 2) of the control device 30 and controlled by the photographing controller 312.

The image data of the image photographed by the photographing unit 50 may be stored in an after-mentioned storage 32. The nail image obtained by the photographing unit 50 may be transmitted to the terminal device 7 via the communication unit 14.

The printing unit 40 includes a print head 41 that performs printing on the nail surface while moving above the nail T (that is, above the nail surface), a driver 49 (see FIG. 2) that moves the print head 41, and the like.

The driver 49 can move the print head 41 in a first direction and a second direction that cross each other.

The first direction and the second direction in the embodiment are the X direction (X direction in FIG. 1, left-right direction of the printing device 1) and the Y direction (Y direction in FIG. 1, front-rear direction of the printing device 1). In other words, it can be said that the first direction is the left-right direction with respect to the finger inserting direction, and the second direction is the finger inserting direction.

The print head 41 is mounted on a head holder 42. The head holder 42 in the present embodiment is a carriage that moves together with the print head 41.

The head holder 42 is supported by an X-direction moving stage (not shown in the drawings) for moving the print head 41 in the X direction and a Y-direction moving stage (not shown in the drawings) for moving the print head 41 in the Y direction. The driver 49 includes an X-direction moving motor 46 and a Y-direction moving motor 48 as a driving unit for moving the print head 41 and the head holder 42 on which the print head 41 is mounted in the X direction and the Y direction as needed (see FIG. 2).

Figure 4:
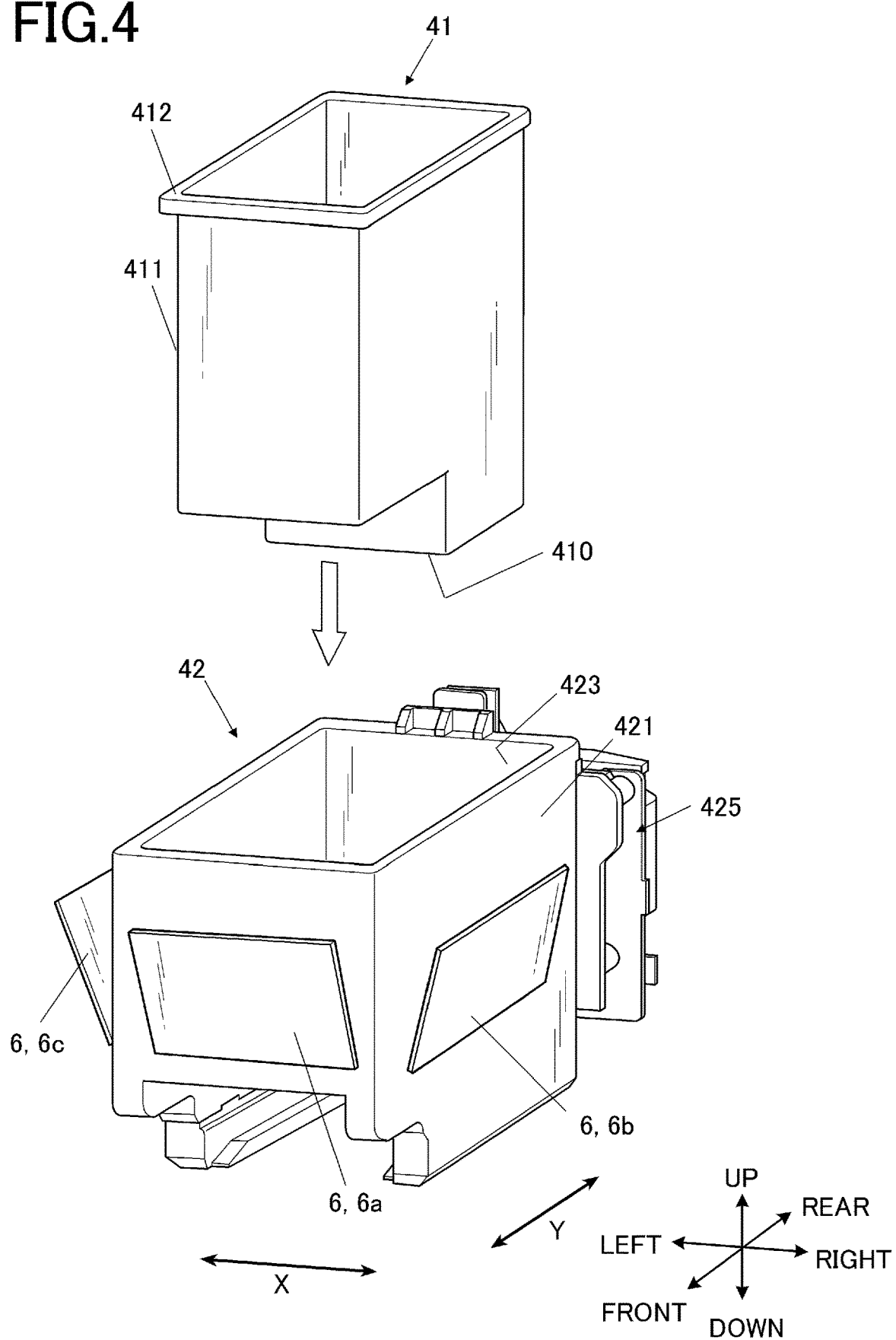
FIG. 4 is a perspective view of a print head and the head holder in the embodiment.

FIG. 4 is a perspective view of the print head and the head holder to which the print head is attached in the present embodiment.

As shown in FIG. 4, the head holder 42 includes a holder body 421 in a substantially box shape which is vertically open. The print head 41 is inserted into an upper opening 423 of the holder body 421 from above and thereby attached to the head holder 42. The peripheral of the upper surface of the print head 41 is a flange portion 412 protruding to the outer side than a body portion 411. The upper opening 423 of the head holder 42 is formed to be larger than the body portion 411 of the print head 41 and smaller than the flange portion 412. When the print head 41 is attached to the head holder 42, the flange portion 412 is caught on the upper end surface of the upper opening 423 to prevent the print head 41 from coming out from the head holder 42.

An attachment 425 that is attached to the driver 49 is provided on the back surface (surface on the rear side in the Y direction) of the head holder 42.

As shown in FIG. 4, the reflecting members 6 (reflecting members 6a, 6b and 6c, the simple term "reflecting members 6" include all of the reflecting members 6a, 6b and 6c) are provided on the front surface and the left and right lateral surfaces of the holder body 421.

The reflecting members 6 in the embodiment are mirrors that perform specular reflection, for example. The reflecting members 6 are not limited to the mirrors. For example, prism can be applied as the reflecting members 6.

The reflecting members 6 are configured to be movable in the X and Y directions by movement of the head holder 42.

In the embodiment, by the movement of the reflecting members 6 in the X and Y directions, it is possible to photograph at least the lateral images from the lateral sides and the front image from the tip side of the finger U for the finger U and the nail T held by the finger holder 6 with the photographing unit 50.

To be specific, the driver 49 in the present embodiment can position the head holder 42 at such a position that the right lateral surfaces of the finger U and the nail T can be within the photographing possible range of the photographing device 51 of the photographing unit 50 by the reflecting member 6c (right position of the finger holder 2 shown by the solid line in FIG. 3), such a position that the left lateral surfaces of the finger U and the nail T can be within the photographing possible range of the photographing device 51 by the reflecting member 6b (left position of the finger holder 2 shown by the two-dotted chain line in FIG. 3), and such a position that the front surfaces of the finger U and the nail T seen from the tip side can be within the photographing possible range of the photographing device 51 by the reflecting member 6a (rear position in the Y direction of the finger holder 2 shown by the two-dotted chain line in FIG. 3), in addition to the position where the print head 41 performs printing on the nail T (that is, such a position that the ink ejection surface 410 faces the surface of the nail T).

Thus, the right lateral surfaces of the finger U and the nail T can be reflected at the reflecting member 6c to be within the photographing possible range of the photographing device 51. Furthermore, the left lateral surfaces of the finger U and the nail T can be reflected at the reflecting member 6b to be within the photographing possible range of the photographing device 51. Furthermore, the tip-side front surfaces of the finger U and the nail T can be reflected at the reflecting member 6a to be within the photographing possible range of the photographing device 51.

When the finger U and the nail T are photographed via the reflecting members 6, the positions of the reflecting members 6 may be adjusted on the basis of the images obtained by photographing via the reflecting members 6.

For example, after the head holder 42 is moved to approximate positions on the right and left sides of the finger holder 2 and behind the finger holder 2, photographing by the photographing unit 50 may be started and fine adjustment of the positions of reflecting members 6 may be performed on the basis of the images obtained via the reflecting members 6.

Furthermore, for example, in the case where the photographing unit 50 can take a moving image that can be displayed as live view on the display 13, the display 72 of the terminal device 7 or the like, after the head holder 42 is moved to near the finger holder 2, the moving image imaging may be started via the reflecting members 6, and the reflecting members 6 may be moved to appropriate positions that enable photographing of the entire fingertip on the basis of the moving image.

Though not particularly limited, the arrangement, size, shape and the like of the reflecting members 6 (reflecting members 6a, 6b and 6c) are the arrangement, size, shape and the like of such a degree that enable photographing of the fingertip portion of the finger U held by the finger holder 2. The specific arrangement, size and the like are appropriately set according to the position and the like of the photographing unit 50 (photographing device 51 that is a camera).

In the illustrated example in the present embodiment (see FIG. 4, for example), plate-like reflecting members 6 (mirrors) are attached to attachment surfaces of the head holder 42 (respective outer surfaces of the holder body 421) in an inclined state having an appropriate angle with respect to the attachment surfaces. The "appropriate angle" can be appropriately changed according to the angle of view of the photographing device 51 and the positional relationship with respect to the finger holder 2.

The print head 41 in the present embodiment has the surface facing the nail surface as an ink ejection surface 410 including multiple nozzle openings (not shown in the drawings) to eject ink. The print head 41 is an inkjet type inkjet head that performs printing by making micro droplets of ink and directly spraying, from the ink ejection surface, the ink onto the nail surface which is the surface to be printed of the printing target (nail T).

Since the ink ejected from the print head 41 is micro droplets, when the distance between the print head 41 and the surface of the nail T is excessively far, the ink cannot attach to the correct position, which disables high-definition printing. Thus, it is preferable to perform the printing by the print head 41 in a state in which the ink ejection surface facing the nail surface is positioned above the nail surface by approximately several millimeters.

The print head 41 can eject ink of colors such as C (CYAN), M (MAGENTA), and Y (YELLOW), for example. The type of the color ink which can be ejected by the print head 41 is not limited to them, and the print head 41 may be able to eject ink of other colors. For example, the print head 41 may be able to eject the ink of white color or the like which can be a background of the design.

The print head 41, the X-direction moving motor 46 and the Y-direction moving motor 48 as a driving unit that drives the print head 41 in the printing unit 40 are connected to the printing controller 315 (see FIG. 2) of the control device 30 and controlled by the printing controller 315.

The control device 30 mounted on the printing device 1 is a computer that includes: a controller 31 (see FIG. 2) configured by including a processor(s) such as a CPU (Central Processing Unit) not shown in the drawings; and a storage 32 (see FIG. 2) configured by including a ROM (Read Only Memory), a RAM (Random Access Memory) (none of them shown in the drawings), and the like.

The storage 32 stores various types of programs and data to operate the printing device 1 and the like.

To be specific, the storage 32 includes a program storage region 321 to store various programs such as a printing program for performing printing processing and a nail information storage region 322 to store various types of information regarding the nail T.

The components of the printing device 1 are integrally controlled by the control device 30 executing programs stored in the program storage region 321.

In a functional view, the controller 31 includes a communication controller 311, a photographing controller 312, a nail information detector 313, a printing data generator 314, a printing controller 315, a display controller 316, and the like. The functions as the communication controller 311, photographing controller 312, nail information detector 313, printing data generator 314, printing controller 315, display controller 316, and the like are realized by cooperation between the CPU of the controller 31 and the programs stored in the program storage region 321 of the storage 32.

The communication controller 311 controls the operation of the communication unit 14. In the present embodiment, the communication controller 311 controls the communication with the terminal device 7, and receives data of a nail design and the like when the data and the like are transmitted from the terminal device 7.

When the nail image is obtained by the photographing unit 50, the communication controller 311 may transmit the nail image data to the terminal device 7.

The photographing controller 312 controls the photographing device 51 and the illuminating device 52 of the photographing unit 50, and controls the photographing device 51 to photograph an image of the finger (hereinafter, referred to as a "nail image") including an image of the nail T of the finger U held by the finger holder 2.

The image data of the nail image acquired by the photographing unit 50 is transmitted to the terminal device 7 via the communication unit 14. The image data may be stored in the storage 32.

In the present embodiment, the controller 31 (photographing controller 312, printing controller 315) controls the photographing unit 50 to perform photographing via the reflecting members 6.

That is, the controller 31 operates the driver 49 to move the reflecting members 6, and controls the photographing unit 50 to photograph to obtain nail images of the finger U held by the finger holder 2 via the reflecting members 6.

As mentioned above, in the present embodiment, the driver 49 can move the print head 41 in the first and second directions that cross each other. By moving the reflecting members 6 in the first and second directions with the driver 49, the controller 31 controls the photographing unit 50 to photograph to obtain at least the lateral images from the lateral sides and the front image from the tip side of the finger U.

The nail information detector 313 detects nail information regarding the nail T of the finger U on the basis of the images of the nail T of the finger U placed on the finger holder 2 photographed by the photographing device 51.

In the embodiment, the nail information includes, for example, the outline of the nail T (nail shape, XY coordinates of horizontal position of the nail T, etc.), the inclination angle to the XY plane of the surface of the nail T (inclination angle of the nail T, nail curvature), the height of the nail T (position in vertical direction of the nail T, hereinafter, also referred to as "height position of the nail T"), and the like.

In the embodiment, the nail information detector 313 functions as a posture state detector that detects the posture state of the nail T on the basis of the image obtained by the photographing unit 50.

In the embodiment, as mentioned above, not only the image of upper surface (upper image) of the nail T, but also the images from the lateral surfaces (lateral images) of the finger U and the nail T and the image from the tip side (front image) of the finger U and the nail T via the reflecting members 6 are photographed by the photographing device 51 of the photographing unit 50. By analyzing the upper image, lateral images and front image, the nail information detector 313 obtains various types of nail information regarding the posture state of the nail T. The nail information detected by the nail information detector 313 is not limited to this, and other information may be obtained.

The detection of nail information by the nail information detector 313 will be described in detail later.

The printing data generator 314 sets a printing region by the printing unit 40 from the detection result by the nail information detector 313, and generates the printing data.

In the embodiment, the photographing unit 50 photographs the nail T which is a printing target, and the nail information detector 313 detects the nail information such as the outline of the nail T regarding the photographed nail image. The printing data generator 314 sets the printing region (nail region) by the printing unit 40 on the basis of the detection result, and generates the printing data.

To be specific, the printing data generator 314 cuts off the image data of the nail design selected by the user which is the printing target in accordance with the shape of this nail region (outline shape of the nail T), and performs enlargement or reduction, or the like as needed, to generate the printing data.

When the curvature or the like of the nail T is detected by the nail information detector 313, the printing data generator 314 may perform curved surface correction to the printing data on the basis of the curvature of the nail T or the like. By performing the curved surface correction, it is possible to generate the printing data which more fits the shape of the nail T.

The printing controller 315 is a controller that controls the print head 41 (ink ejection driving unit of the print head 41 not shown in the drawings) and the driver 49 to operate. To be specific, the printing controller 315 outputs a control signal to the printing unit 40 on the basis of the printing data generated by the printing data generator 314, and controls the X-direction moving motor 46, the Y-direction moving motor 48, the print head 41, and the like of the printing unit 40 to perform printing according to the printing data to the nail T.

The display controller 316 controls the display 13 to display various types of display screens on the display 13.

For example, the display controller 316 may control the display 13 to display the upper image, lateral images and front image of the finger U and the nail T obtained by the photographing unit 50. When the photographing unit 50 can take a moving image, for example, the display controller 316 may control the display 13 to perform live view display of a moving image showing the finger U being held by the finger holder 2 as needed.

As mentioned later, in the embodiment, when the nail information detector 313 as a posture state detector detects that the posture state of the nail T is not within the allowable range, this detection result is displayed on the display screen of the display 13 to notify the user, or a message urging the user to correct the posture state of the nail T or the like is displayed. In such a way, the display 13 functions as the notifier.

In addition, the display controller 316 may control the display 13 to display messages to the user, various instructions and the like.

As mentioned above, in the present embodiment, the printing device 1 cooperates with the terminal device 7 to operate.

The terminal device 7 is a portable terminal device such as a smartphone, for example. The terminal device 7 is not limited to the smartphone. For example, the terminal device 7 may be a tablet type personal computer (hereinafter, referred to as a PC), a notebook PC, a stationary PC, a terminal device for a game, or the like.

As shown in FIG. 2, the terminal device 7 includes an operation unit 71, a display 72, a communication unit 73, a control device 80, and the like.

The operation unit 71 can perform various inputs and settings according to user operations. The operation unit 71 is a touch panel integrally provided with the surface of the display 72, for example. When the operation unit 71 is operated, an input signal corresponding to the operation is transmitted to a controller 81.

On the touch panel configured on the display 72, various operation screens are displayed in accordance with control by an after-mentioned display controller 812, and the user can perform various input/setting operations and the like by touch operations on the touch panel.

The operation unit 71 for performing various input/setting operations and the like is not limited to the touch panel. For example, various operation buttons, a keyboard, and the like may be provided as the operation unit 71.

In the present embodiment, by the user operating the operation unit 71, various instructions such as start printing are output to the printing device 1 from the terminal device 7, and the terminal device 7 functions as an operation unit of the printing device 1.

In addition, by the user operating the operation unit 71, it is possible to select a nail design (design) to be printed on the nail T.

The display 72 is configured by including an LCD (Liquid Crystal Display), an organic electroluminescence display, other flat displays or the like, for example.

As mentioned above, the touch panel for performing various types of input may be integrally configured on the surface of the display 72. In this case, the touch panel functions as the operation unit 71.

In the present embodiment, the display 72 can display the nail design which was input and selected via the operation unit 71 by the user, various types of guide screens, warning display screens, and the like.

The communication unit 73 is configured to be communicable with the communication unit 14 of the printing device 1.

The communication between the printing device 1 and the terminal device 7 may be performed by either a wireless connection method or a wired connection method as mentioned above, and the specific method is not limited. The communication unit 73 may be any unit as long as it can communicate with the printing device 1, and a communication unit that matches the communication standard of the communication unit 14 of the printing device 1 is applied.

The communication unit 73 is connected to an after-mentioned communication controller 811 (see FIG. 2) of the control device 80, and controlled by the communication controller 811.

As shown in FIG. 2, the control device 80 of the terminal device 7 in the embodiment is a computer that includes: a controller 81 configured by including a processor(s) such as a CPU (Central Processing Unit) not shown in the drawings; and a storage 82 configured by including a ROM (Read Only Memory), a RAM (Random Access Memory) (none of them shown in the drawings), and the like.

The storage 82 stores various types of programs and data to operate the components of the terminal device 7 and the like.

To be specific, the ROM or the like in the embodiment stores various programs such as a nail print application program 821b for performing nail printing using the printing device 1 in addition to an operation program 821a for integrally controlling the components of the terminal device 7. The controller 81 loads these programs to a working area of the RAM, for example, and executes the programs, thereby the components of the terminal device 7 are integrally controlled.

The storage 82 in the embodiment includes a design storage region 822 storing data of nail designs (designs), and the like.

Each of the nail designs (designs) stored in the design storage region 822 may be an existing design which was prepared in advance or may be a design which was created by the user. In the case where the terminal device 7 can be connected to various networks, the user may be allowed to take in nail designs (designs) stored in a server device and the like (not shown in the drawings) which can be connected to the network.

In a functional view, the controller 81 of the terminal device 7 includes a communication controller 811, a display controller 812, and the like. The functions as the communication controller 811, display controller 812, and the like are realized by cooperation between the CPU of the controller 81 and the programs stored in the ROM of the storage 82. The functions included in the controller 81 of the terminal device 7 are not limited to them, and the controller 81 may include other various function units.

The communication controller 811 controls the operation of the communication unit 73. In the present embodiment, the communication controller 811 controls the communication with the printing device 1, and transmits data of nail design and the like to the printing device 1.

The display controller 812 controls the display 72 to display various display screens on the display 72.

Next, with reference to FIGS. 5 to 17, the action of the printing device 1 in the embodiment, particularly the processing of confirming the posture of the nail T will be described.

When nail printing is performed by using the printing device 1 in the embodiment, the user operates the operation unit 12 of the printing device 1 or the like, to turn on and activate the printing device 1.

The user also turns on the terminal device 7 and selects execution of nail print processing from the operation unit 71 of the terminal device 7. Thereby, the nail print application program 821b is activated.

When the nail print application program 821b is activated, the display controller 812 of the terminal device 7 controls the display 72 to display a list of nail designs and a message or the like instructing to select a desired design. Next, the user selects the nail design to be printed on the nail T by operating the touch panel and other operation unit 71. Thereby, the operation signal is transmitted to the control device 80, and the desired nail design is selected as a design to be printed on the nail T. The information on the selected nail design is also transmitted to the control device 30 of the printing device 1 from the terminal device 7.

Figure 5:
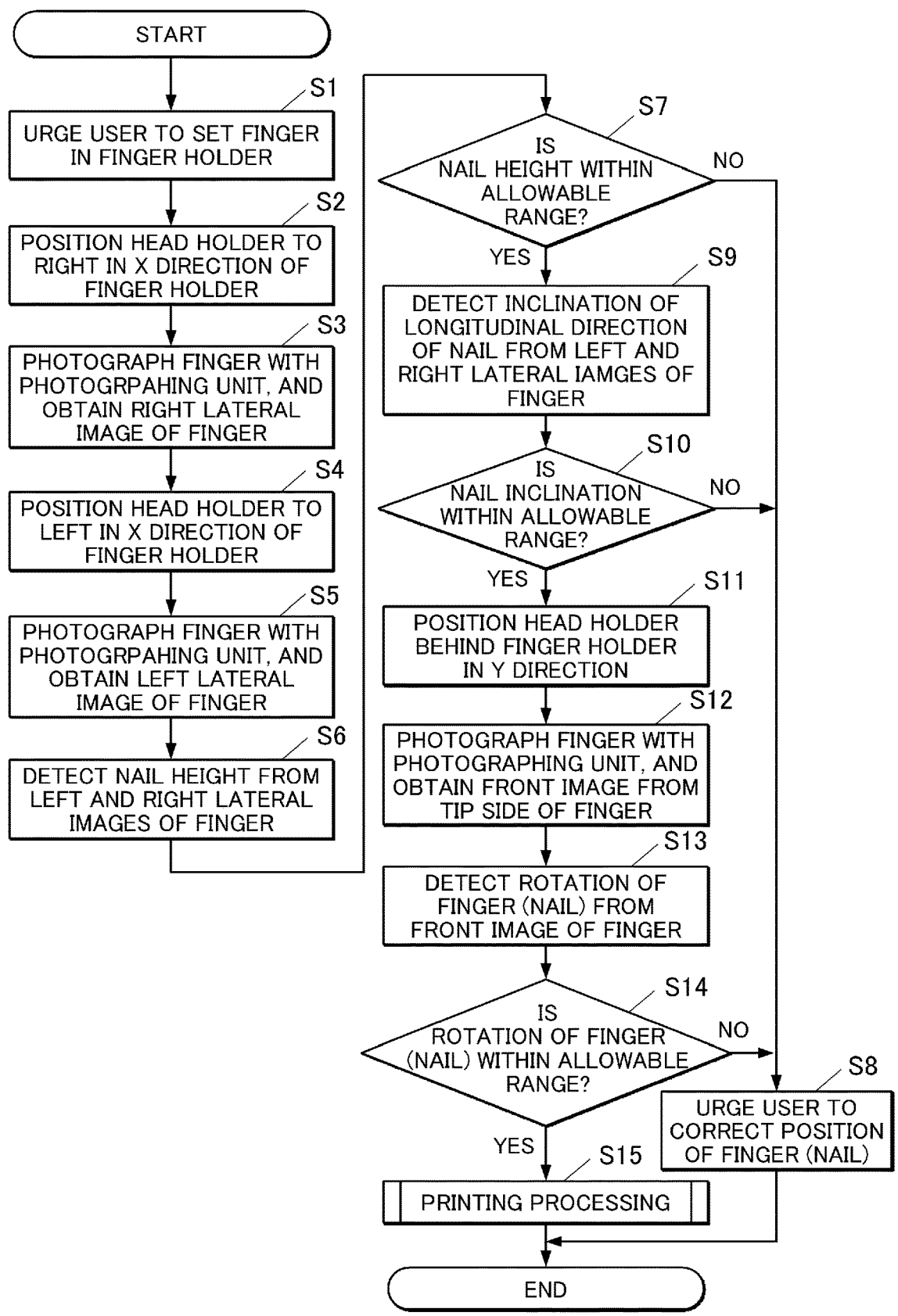
FIG. 5 is a flowchart showing nail posture confirmation processing according to the embodiment.

Next, as shown in the flowchart in FIG. 5, the display controller 812 urges the user to place the nail T to be printed (and its finger U) on the finger holder 2 of the printing device 1 (step S1). To be specific, the display controller 812 of the terminal device 7 controls the display 72 to display an instruction screen instructing to set the finger U on the finger holder 2 of the printing device 1.

When the finger U is set, the controller 31 operates the driver 49 to position the head holder 42 to the right in the X direction of the finger holder 2 first (step S2). The strict position in the X and Y directions of the head holder 42 is such a position that the photographing device 51 of the photographing unit 50 can focus on the right lateral surfaces of the finger U and the nail T held on the finger holder 2 via the reflecting member 6c provided on the lateral surface of the head holder 42. Thus, fine adjustment is performed to the position of the head holder 42 such that the reflecting member 6c is positioned at the appropriate position.

When the head holder 42 is positioned at the appropriate position, the photographing unit 50 photographs the finger U and the nail T, and obtains the right lateral image of the finger U and the nail T (step S3).

FIG. 6 is an explanatory view schematically showing the positional relationship between the finger holder, the head holder having the reflecting members and the photographing unit in the case of obtaining the right side lateral image of the nail. FIG. 6 shows a state seen from the fingertip side of the head holder 42 and the like.

As shown in FIG. 6, in this case, the reflecting member 6c provided on the left side in the X direction of the head holder 42 faces the right lateral surfaces of the finger U and the nail T, and the right lateral image of the finger U and the nail T is photographed via the reflecting member 6c by the photographing unit 50.

Figure 7:
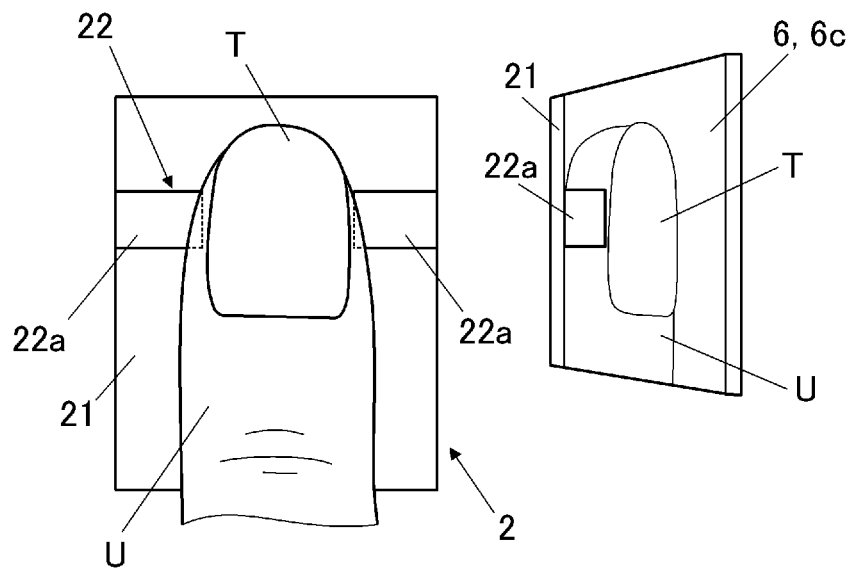
FIG. 7 is a schematically upper view showing an example of the position of a finger in the configuration shown in FIG. 6 and an image reflected in the reflecting member.

FIG. 7 is a schematically upper view showing an example of the finger position and an image reflected in the reflecting member in the configuration shown in FIG. 6.

As shown in FIG. 7, in this case, the right lateral surfaces of the finger U and the nail T are reflected in the reflecting member 6c, together with the finger supporting member 21 and the fingertip placing unit 22 of the finger holder 2 on which the finger U is placed.

Figure 8:
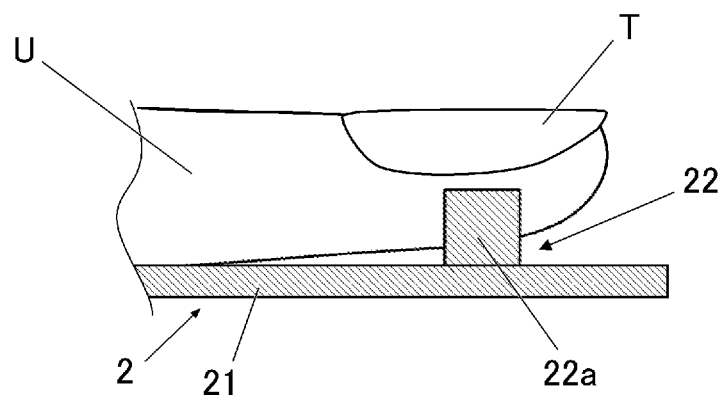
FIG. 8 is a schematically lateral view showing an example of a nail image obtained by the configuration shown in FIG. 6.

FIG. 8 is a schematically lateral view showing an example of the nail image obtained by the configuration shown in FIG. 6.

By performing the photographing in a state in which the image as shown in FIG. 7 is reflected in the reflecting member 6c, as shown in FIG. 8, the lateral image of the right side of the finger U and the nail T (nail image) is obtained together with the image of the finger supporting member 21 and the fingertip placing unit 22.

It is not essential to photograph the finger supporting member 21 and the fingertip placing unit 22 together with the lateral image (nail image) of the right side of the finger U and the nail T. However, it is preferable to capture the finger supporting member 21 and the fingertip placing unit 22 in the same image as the nail image since the height position or the like of the finger supporting member 21 and the fingertip placing unit 22 are grasped by the device and can be a reference of the height of the nail T and the like.

Next, the controller 31 operates the driver 49 to position the head holder 42 to the left in the X direction of the finger holder 2 (step S4). The strict position in the X and Y directions of the head holder 42 is such a position that the photographing device 51 of the photographing unit 50 can focus on the left lateral surface of the finger U and nail T held on the finger holder 2 via the reflecting member 6b provided on the lateral surface of the head holder 42. Thus, fine adjustment is performed to the position of the head holder 42 such that the reflecting member 6b is positioned at the appropriate position.

When the head holder 42 is positioned at the appropriate position, the photographing unit 50 photographs the finger U and the nail T, and obtains the left lateral image of the finger U and the nail T (step S5).

FIG. 9 is an explanatory view schematically showing the positional relationship between the finger holder, the head holder having the reflecting members and the photographing unit in the case of obtaining the left side lateral image of the nail. FIG. 9 shows a state seen from the fingertip side of the head holder 42 and the like, similarly to FIG. 6.

As shown in FIG. 9, in this case, the reflecting member 6b provided on the right side in the X direction of the head holder 42 faces the left lateral surfaces of the finger U and the nail T, and the left lateral image of the finger U and the nail T is photographed via the reflecting member 6b by the photographing unit 50.

Figure 10:
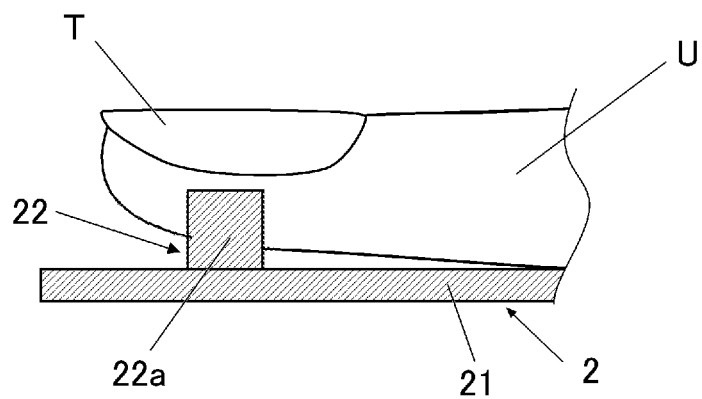
FIG. 10 is a schematically lateral view showing an example of a nail image obtained by the configuration shown in FIG. 9.

FIG. 10 is a schematic lateral view showing an example of a nail image obtained by the configuration shown in FIG. 9.

By performing the photographing in such an arrangement, the lateral image of the left side of the finger U and nail T (nail image) is obtained as shown in FIG. 10.

When the left and right lateral images of the finger U and nail T (nail images) are obtained, the nail information detector 313 which is the posture state detector detects the height of the nail T on the basis of the lateral images (step S6).

The method for detecting the height of the nail T by the nail information detector 313 is not particularly limited. For example, the nail information detector 313 detects the height position of the nail T by detecting the distance from the upper surface of the finger supporting member 21 reflected in the nail image to the upper surface of the nail T.

Figure 11:
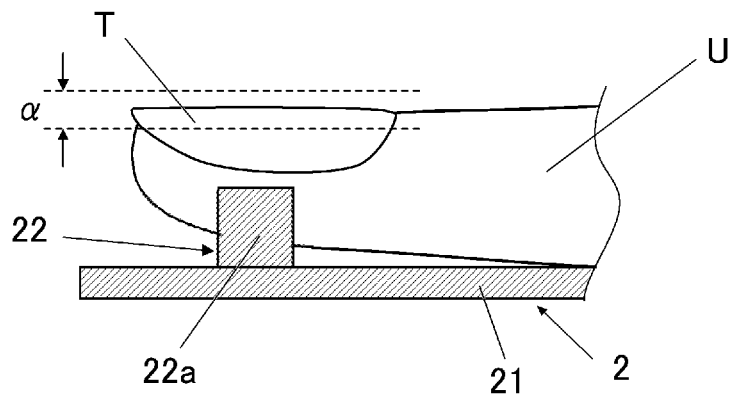
FIG. 11 is a lateral view showing an example of a nail height position appearing in the lateral image of the nail and showing an example of the case where the nail height position is appropriate.
Figure 12:
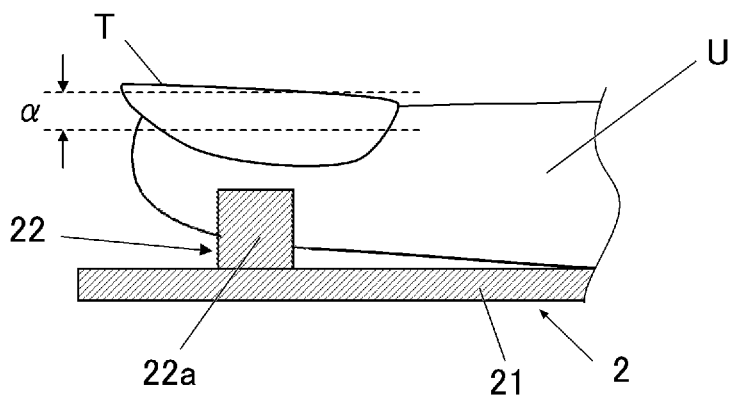
FIG. 12 is a lateral view showing an example of a nail height position appearing in the lateral image of the nail and showing an example of the case where the nail height position is excessively high.
Figure 13:
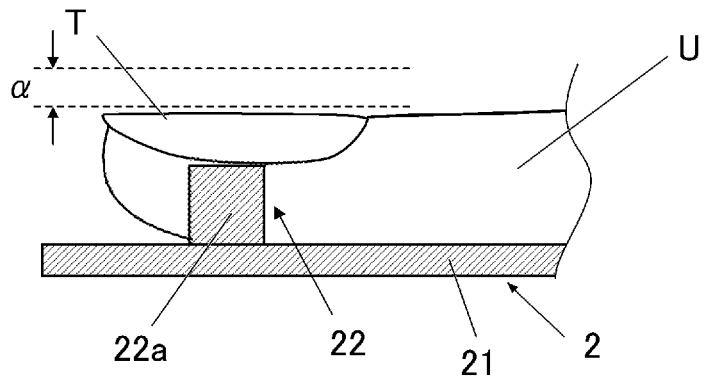
FIG. 13 is a lateral view showing an example of a nail height position appearing in the lateral image of the nail and showing an example of the case where the nail height position is excessively low.

From the detection result of nail information detector 313, the controller 31 determines whether or not the height of the nail T is within the allowable range α (see the allowable range α which is between the upper and lower limits shown by the broken lines in FIGS. 11 to 13) (step S7).

In the case of printing on the nail T by using an inkjet type print head 41 as in the present embodiment, when the print head 41 is positioned too far away from the surface of the nail T, the ink cannot attach to the correct position and high-grade printing cannot be performed, as mentioned above. On the other hand, when the surface of the nail T is too close to the print head 41, there is a possibility that the print head 41 hits the nail T, which causes an injury or breakdown.

Thus, as for the height of the nail T, it is preferable that the height position of nail surface is positioned approximately several millimeters above the ink ejection surface 410 of the print head 41.

In the embodiment, the upper and lower limits of the height of the nail T are set from this point of view, and the controller 31 determines whether or not the height of the nail T detected by the nail information detector 313 is within the allowable range α that is the range between the set upper and lower limits.

FIGS. 11 to 13 are views showing examples of the height position of nail appearing in the lateral images of the nail. FIG. 11 is a lateral view showing an example of the case where the nail height position is appropriate.

In the example shown in FIG. 11, the entire upper surface of the nail T is positioned within the allowable range α shown by the two broken lines. In this case, the controller 31 determines that the height of the nail T is within the allowable range α (step S7; YES). In the case where only a part of the nail T is out of the allowable range α, furthermore, in the case where being out of the allowable range α is such a level that does not greatly influence the printing in consideration of the position of the portion out of the allowable range α (for example, whether it is the central portion of the nail T, or border portion (root) of the nail T, etc.), the range of the portion out of the allowable range α, the degree of being out of the allowable range α, and the like, the controller 31 may determine that the height when seen as the height of the entire nail T is within the allowable range.

On the other hand, in the example shown in FIG. 12, the tip portion of the nail T is positioned above the allowable range α shown by the two broken lines. In the example shown in FIG. 13, the entire nail T is positioned below the allowable range α shown by the two broken lines. In these cases, the controller 31 determines that the height of the nail T is not within the allowable range α (step S7; NO), and urges the user to correct the position of the finger U such that the height position of the nail T is within the allowable range α (step S8). To be specific, in the case of example shown in FIG. 12, a message such as "Lower the height of nail T." is displayed on the display screen of the display 13 which is the notifier. In the case of example shown in FIG. 13, a message such as "Raise the height of nail T." is displayed on the display screen of the display 13.

In this case, when the gap in the fingertip placing unit 22 (gap between the pair of fingertip placing units 22a) can be adjusted automatically or manually, in the example shown in FIG. 12, for example, the gap is adjusted to be slightly widened so as to slightly lower the finger U to be placed. When the finger U is completely fallen on the upper surface of the finger supporting member 21 as shown in FIG. 13, the gap may be adjusted to be narrowed to support the fingertip at a position slightly rising from the upper surface of the finger supporting member 21.

In the case of requesting the user to correct the height position of the nail T, as shown in FIGS. 12 and 13 for example, lines, marks or the like indicating the allowable range α may be superimposed on the lateral image of the nail T and displayed on the display 13. Thereby, the user easily understands the degree to correct the height position of the nail T and the height to which the height position should be adjusted, and thus the user can perform the correction appropriately.

On the other hand, when it is determined that the height of the nail T is within the allowable range α, the controller 31 further detects the inclination of the longitudinal direction of the nail T on the basis of the left and right lateral images (nail images) of the finger U and the nail T (step S9). The longitudinal direction of the nail T in the embodiment indicates the direction extending from the root of the nail T to the nail tip in the lateral image, for example. That is, it can be said that the inclination of the longitudinal direction of the nail T is the angle made between the horizontal direction and the longitudinal direction of the nail T.

As mentioned above, the position at which the ink ejected from the print head 41 attaches is influenced by the distance from the ink ejection surface 410 of the print head 41 to the surface of the nail T which is the printing target surface. Thus, when the inclination of the nail T is large, there is a possibility that the grade of printing is deteriorated. Thus it is preferable that the printing is performed with the surface of the nail T which is the printing target surface being as horizontal as possible.

The method for detecting the inclination of the longitudinal direction of the nail T by the nail information detector 313 is not particularly limited. For example, the nail information detector 313 detects the nail tip position P1 on the upper surface of the nail T and the border (root of the nail T) position P2 (see FIGS. 14 and 15) in the nail image, and detects the inclination of the nail T by comparing the heights of the nail tip position P1 and the root position P2.

To be specific, the nail information detector 313 extracts the outline of the lateral surface of the nail T from the lateral images of both of the left and right lateral surfaces of the nail T obtained in steps S3 and S5, detects the nail tip position P1 and the root position P2 of the nail T, and calculates the inclination of the nail T from these positions.

The controller 31 determines whether or not the inclination of the nail T is within the allowable range from the detection result of nail information detector 313 (step S10). The threshold for determining whether or not the inclination is within the allowable range is set in advance as needed and stored in the storage 32.

Figure 14:
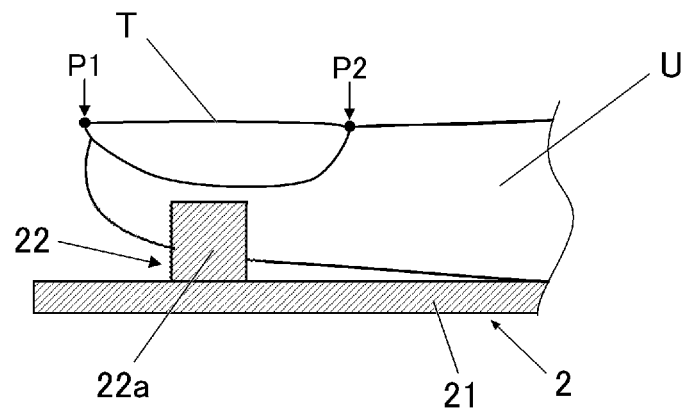
FIG. 14 is a lateral view showing an example of an inclination of a longitudinal direction of the nail appearing in the lateral image of the nail and showing an example of the case where the nail inclination is appropriate.
Figure 15:
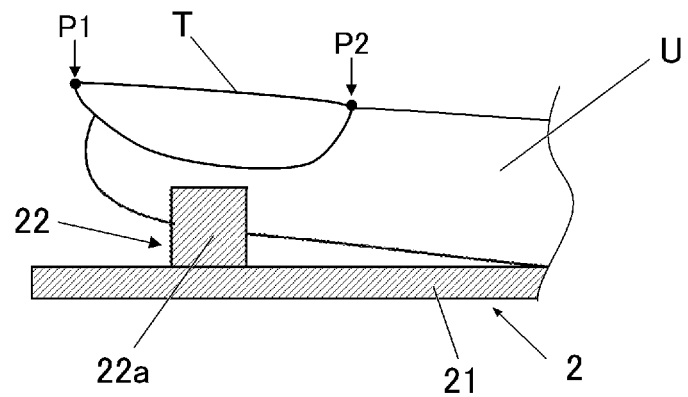
FIG. 15 is a lateral view showing an example of an inclination of the longitudinal direction of the nail appearing in the lateral image of the nail and showing an example of the case where the nail is inclined exceeding an allowable range.

FIG. 14 illustrates the case where the nail tip position P1 and the root position P2 of the nail T are aligned at a substantially same height. FIG. 15 illustrates the case where the nail tip position P1 of the nail T is greatly higher than the border position P2 and the inclination of the nail T is large.

For example, if the nail T is substantially horizontal as shown in FIG. 14, the controller 31 determines that the inclination is within the allowable range (step S10; YES).

On the other hand, if the nail T is largely inclined as shown in FIG. 15, the controller 31 determines that the inclination is not within the allowable range (step S10; NO). In this case, similarly to the case where the height position of the nail T exceeds the allowable range α, the controller 31 urges the user to correct the position of the finger U such that the nail T becomes as horizontal as possible (step S8). To be specific, in the case of example shown in FIG. 15, the controller 31 controls the display 13 that is the notifier to display a message such as "Lower the tip of nail T a little." on the display screen.

Also in this case, as shown in FIG. 15 for example, the controller 31 may control the display 13 to superimpose the nail tip position P1 and the border position P2 and a line or the like indicating the horizon on the lateral image of the nail T and display them. Thereby, the user easily understands how and how much degree to correct the inclination of the nail T, and thus the user can perform appropriate correction.

If it is determined that the inclination is within the allowable range, the controller 31 operates the driver 49 to position the head holder 42 behind (on the back side) in the Y direction of the finger holder 2 (step S11, see the position indicated by the two dotted chain line in FIG. 3). The strict position in the X and Y directions of the head holder 42 is such a position that the photographing device 51 of the photographing unit 50 can focus on the front surface of the finger U and nail T held on the finger holder 2 via the reflecting member 6a provided on the front surface of the head holder 42. Thus, fine adjustment is performed to the position of the head holder 42 such that the reflecting member 6a is positioned at the appropriate position.

When the head holder 42 is positioned at the appropriate position, the photographing unit 50 photographs the finger U and the nail T, and obtains the front image from the tip side of the finger U and the nail T (step S12).

Figure 16:
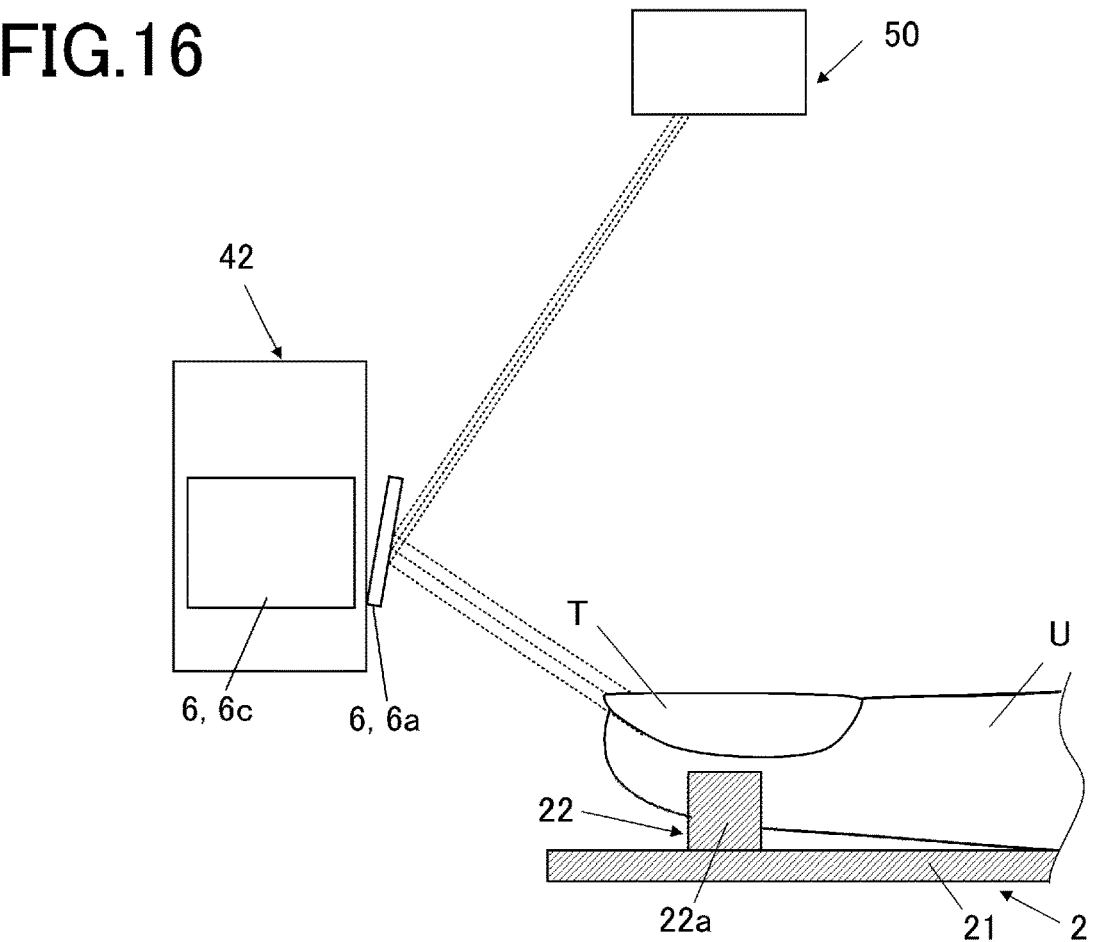
FIG. 16 is an explanatory view schematically showing the positional relationship between the finger holder, the head holder having the reflecting members and the photographing unit in the case of obtaining a front image from the tip side of the nail.

FIG. 16 is an explanatory view schematically showing a positional relationship between the finger holder, the head holder having the reflecting members and the photographing unit in the case of obtaining the front image from the tip side of the nail. FIG. 16 shows a state of the head holder 42 and the like seen from the left side.

As shown in FIG. 16, in this case, the reflecting member 6a provided on the front surface of the head holder 42 faces the tip side of the finger U and nail T, and the front image from the tip side of the finger U and nail T is photographed by the photographing unit 50 via the reflecting member 6a.

Figure 17:
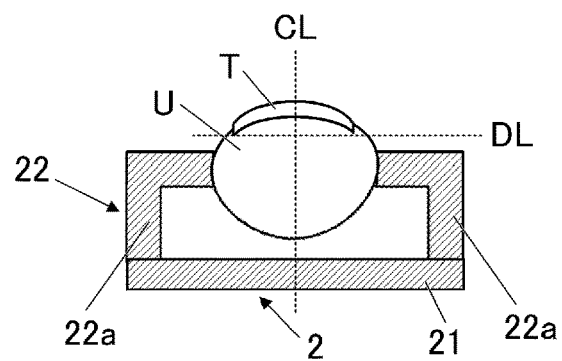
FIG. 17 is a schematically side view showing an example of a nail image obtained by the configuration shown in FIG. 16, and showing the case where the nail is almost not rotated.
Figure 18:
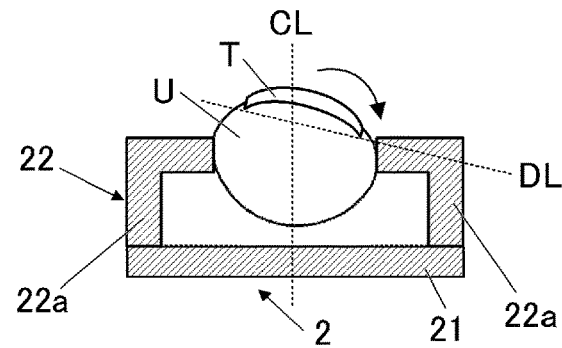
FIG. 18 is a side view showing an example of an inclination of the longitudinal direction of the nail appearing in the front image of the nail and showing an example of the case where the nail is inclined exceeding an allowable range.

FIGS. 17 and 18 are schematically front views showing examples of nail image obtained by the configuration shown in FIG. 16.

By performing the photographing in such an arrangement, a front image (nail image) from the tip side of the finger U and nail T is obtained as shown in FIGS. 17 and 18.

When the front image (nail image) from the tip side of the finger U and nail T is obtained, the nail information detector 313 that is the posture state detector detects the rotation of the nail T (rotation of the finger U, inclination of the width direction of the nail T) on the basis of the front image (step S13).

As mentioned above, the position at which the ink ejected from the print head 41 attaches is influenced by the distance from the ink ejection surface 410 of the print head 41 to the surface of the nail T which is the printing target surface. Thus, in the case where the nail T is rotated and inclined in the width direction of the nail T, similarly to the case where the nail T is inclined in the longitudinal direction, there is a possibility that the printing grade is deteriorated, and it is preferable that the printing is performed in a state in which the surface of the nail T which is the printing target surface is not inclined.

The method for detecting the rotation of the nail T by the nail information detector 313 is not particularly limited. For example, the nail information detector 313 detects the rotation of the nail T by determining whether or not the shape of belly portion of the finger U appearing in the front image of the finger U and nail T is laterally symmetrical, and whether or not the height positions on the left and right sides of the nail T are the same height position.

To be specific, the nail information detector 313 extracts the outline of front surfaces of the finger U and nail T from the front image of the nail T. When a central line CL of the finger U (see FIGS. 17 and 18) is set, the nail information detector 313 determines whether or not the nail T is rotated by whether the shape of the finger U is different on the left and right sides having the central line CL therebetween, and whether the line DL connecting the left and right ends of the nail T is orthogonal to the central line CL or inclined, and the like.

The controller 31 determines whether the nail T is rotated from the detection result of the nail information detector 313 (step S14). The controller 31 determines that the nail T is not rotated when the shape of the finger U has no difference between the left and right sides having the central line CL therebetween, and the line DL connecting the left and right ends of the nail T is orthogonal to the central line CL. Since printing may not be influenced by the rotation of the nail T depending on the level of the rotation of the nail T, a threshold may be set in advance for the allowable rotation level so that the controller 31 refers to this threshold and determines whether or not the rotation of the nail T is within the allowable range.

In the example shown in FIG. 17, the shape of the finger U is not different on the left and right sides having the central line CL therebetween, and the line DL connecting the left and right ends of the nail T is orthogonal to the central line CL. In this case, the controller 31 determines that the rotation of the nail T is within the allowable range (step S14; YES).

On the other hand, in the example shown in FIG. 18, the shape of the finger U is different on the left and right sides having the central line CL therebetween, and the line DL connecting the left and right ends of the nail T is inclined with respect to the central line CL. In this case, the controller 31 determines that the rotation of the nail T is not within the allowable range (step S14; NO).

When the nail T is rotated exceeding the allowable range, the controller 31 urges the user to correct the position of the finger U so as to resolve the rotation of the nail T, similarly to the case where the height position of the nail T exceeds the allowable range α and the case where the inclination of the longitudinal direction of the nail T exceeds the allowable range (step S8). To be specific, in the case of example shown in FIG. 18, the controller 31 controls the display 13 that is the notifier to display a message such as "Rotate the finger U to the right a little to place the nail T horizontal." on the display screen.

Also in this case, as shown in FIG. 17 for example, the controller 31 may control the display 13 to superimpose the central line CL, the line DL connecting the left and right ends of the nail T and the like on the front image of the nail T and display them. Thereby, the user easily understands how and how much degree to correct the inclination of the nail T, and can perform appropriate correction.

From the lateral image of the nail T (see FIGS. 8 and 10), it is possible to detect the distance from the upper surface of the nail T to the lower surface in the depth direction of the nail T (border portion between the nail T and the finger U (skin portion)) (referred to as "depth of the nail T").

When the right side lateral image and the left side lateral image of the nail T are compared regarding the depth of the nail T, the depth of the nail T is normally equal on the left and right sides if the nail T is not rotated.

However, when the shape of the finger U is not different on the left and right sides having the central line CL therebetween in the determination of whether the nail T is rotated, it is considered that the nail T is not rotated, and in this case, it can be determined that the nail T has a shape having different depths on the left and right sides of the nail T in a state in which the nail T is not inclined or rotated.

The order of obtaining the lateral images and the front image of the nail T is not limited to the order shown in FIG. 5. The front image of the nail T may be obtained first and then the left and right lateral images of the nail T may be obtained.

The order of detecting the items of the height position of the nail T, the inclination of the longitudinal direction of the nail T, and the rotation of the nail T are also not limited to the order shown in FIG. 5. The height position of the nail T may be detected, then the rotation state of the nail T may be detected, and the inclination of the longitudinal direction of the nail T may be finally detected.

The items of the height position of the nail T, the inclination of the longitudinal direction of the nail T, and the rotation of the nail T may be detected after obtaining the lateral images and the front image of the nail T.

In the case of urging the user to perform correction in step S8, for example, the controller 31 controls the display 13 to display the screen urging the user to perform the correction, and after a predetermined time has elapsed, the controller 31 returns to step S2 and repeats the nail posture confirmation processing.

There can be considered confirming again only the item(s) exceeding the allowable range, such as confirming only the rotation of the nail T after urging the user to perform the correction in step S8 in the case where only the rotation of the nail T exceeds the allowable range, for example. However, there is a possibility that the nail T is shifted as for other item(s) when any of the height position of the nail T, the inclination of the longitudinal direction of the nail T and the rotation of the nail T is corrected. Thus, it is preferable to return to step S2 and perform all the steps of nail posture confirmation processing again.

When any of the height position of the nail T, the inclination of the longitudinal direction of the nail T and the rotation of the nail T exceeds the allowable range so largely that the correction is difficult, the processing may be ended by controlling the display 13 to display this exceeding.

The controller 31 may proceed to printing processing when the user determines that the exceeding is allowable after the image showing the posture of the nail T (for example, lateral images and front image of the nail T) is displayed on the display 13.

On the other hand, the controller 31 proceeds to printing processing when the rotation of the nail T is within the allowable range (when the nail T is not rotated, or the nail T is merely rotated to an allowable level).

That is, the image (nail image) of the upper surface of the finger U including the nail T is photographed by the photographing unit 50, and the nail information detector 313 detects the nail information such as the outline of the nail T by performing image processing for the nail image obtained by the photographing unit 50.

When the nail information is detected by the nail information detector 313, the printing data generator 314 fits the data of nail design to the nail region which is the printing range on the basis of the nail information, and performs correction and the like as needed to generate the printing data.

When the printing data is generated by the printing data generator 314, the printing controller 315 outputs the printing data to the printing unit 40, and performs the printing operation to the nail T in cooperation with the printing processing program and the like.

Thus, it is possible to perform printing in a state in which the nail T is positioned in a correct posture at a correct position, and it is possible to realize high-quality nail printing.

As described above, according to the present embodiment, the printing device 1 includes: a finger holder 2 that holds a finger U corresponding to a nail which is a printing target; a photographing unit 50 that obtains an image of the finger U and the nail T held on the finger holder 2; and reflecting members 6 that are configured to be movable in the X and Y directions. The printing device 1 is configured such that the photographing unit 50 can photograph at least lateral images from lateral sides and a front image from the tip side of the finger U, for the finger U and the nail T held on the finger holder 2, by moving the reflecting members 6 in the X and Y directions.

Thus, it is possible to photograph the lateral images and the front image of the finger U and the nail T without enabling the photographing unit 50 to move or providing multiple photographing units 50.

Furthermore, by enabling each reflecting member 6 to move, it is not necessary to provide multiple reflecting members even when photographing is performed to photograph images from different angles. Thus, it is possible to avoid the necessity to secure the place to provide the reflecting members 6 in the device, the restriction of member arrangement in the device, and the like.

The various nail posture states such as the height position, inclination of the longitudinal direction and rotation around the axis of the finger U of the nail T cannot be grasped accurately from the image obtained by photographing the nail T from above.

On this respect, by obtaining the lateral images and front image of the finger U and nail T, it is possible to appropriately grasp such various nail posture states, and it is possible to prevent printing from being performed on the nail T which is not in the correct posture.

In the case where the printing device 1 includes a print head 41 and a driver 49 that moves the print head 41 in the X and Y directions, the reflecting members 6 may be provided to the print head 41 or a carriage that moves together with the print head 41. In the present embodiment, the reflecting members 6 are provided on the head holder 42 as a carriage.

By such a configuration, it is possible to move the reflecting members 6 in the X and Y directions by the driver 49 that moves, in the X and Y directions, the print head 41 and the head holder 42 which moves together with the print head 41. Thus, it is not necessary to separately provide a mechanism that moves the reflecting members 6, and it is possible to simplify the device configuration.

In the embodiment, the reflecting members 6 are mirrors.

Thus, it is possible to confirm the posture of the nail T by a relatively inexpensive and simple configuration.

In the embodiment, the printing device 1 further includes a nail information detector 313 as a posture state detector that detects the posture state of the nail T on the basis of the images obtained by the photographing unit 50.

Thus, it is possible to accurately detect the height position of the nail T, the inclination of the longitudinal direction of the nail T, and whether the nail T is rotated on the basis of the images from the multiple angles such as the lateral images and front image of the nail T. Thus, it is possible to prevent printing from being performed to the nail T which is not in the correct posture, and realize the high-grade nail printing.

In the embodiment, the printing device 1 further includes a display 13 as the notifier that notifies the user of the posture state of the nail T on the basis of the detection result by the nail information detector 313 that is the posture state detector.

By having the notifier, it is possible to urge the user to correct the position of the nail T, and prevent printing from being performed to the nail T which is not in the correct posture.

In the embodiment, the printing device 1 further includes the display 13 that displays the image obtained by the photographing unit 50.

Thus, the user can confirm the state of posture of the nail T of the user by seeing the image displayed on the display 13. Thus, it is possible to perform correction appropriately when the nail T is not in the appropriate posture.

Though an embodiment of the present disclosure has been described above, the present disclosure is not limited to the above embodiment, and various modifications can be made within the scope of the present disclosure.

For example, the embodiment takes, as an example, a case where the printing device 1 includes the display 13 as the notifier. However, the display as the notifier is not limited to this. The display 72 of the terminal device 7 may function as the notifier and display various messages, warning screens, and the like. In this case, the display 13 may not be provided in the printing device 1.

Though the embodiment takes, as an example, a case where the notifier is the display 13, the notifier is not limited to the display 13. For example, an audio output unit such as a speaker may be provided as the notifier to the printing device 1 or the terminal device 7 to notify the user by sound, voice, buzzer, or the like. A lamp, indicator or the like may be provided to the printing device 1 or the terminal device 7 and function as the notifier.

The embodiment takes, as an example, a case where the printing device 1 includes the nail information detector 313 as the posture state detector that obtains the nail information from the nail image, to perform image processing or the like and automatically determine the posture state of the nail T (that is, the height position of the nail T, the inclination of the longitudinal direction of the nail T, and whether the nail T is rotated or not). However, it is not essential to have the posture state detector.

For example, the printing device 1 may require the user to confirm the posture state of the nail T by photographing images from multiple angles such as the lateral images and front image of the nail T and controlling the display 13 or the like to display the images.

In this case, the user adjusts the position and posture of the finger U and nail T as needed while checking the display screen, and starts the printing by inputting the instruction to start printing or the like at the time when the user considers the adjustment is completed.

Such a configuration enables the confirmation of posture state by a simple configuration, enables highly flexible response by the user (for example, response handling such a situation that the user wants to perform printing processing early even when the nail T is slightly inclined in the case where the selected picture only needs applying color(s) to the entire region).

The embodiment takes, as an example, a case where the reflecting members 6 are provided to the head holder 42 as a carriage. However, the member to attach the reflecting members 6 is not limited to the head holder 42. For example, when the print head 41 is mounted so as to expose a part of the lateral surface from the head holder 42, a part or all of the reflecting members 6 (that is, reflecting members 6a, 6b and 6c) may be attached to the part of print head 41 exposed outside.

Furthermore, a member other than the head holder 42 may be provided as a carriage configured to be movable by the driver 49. In that case, a part or all of the reflecting members 6 (that is, reflecting members 6a, 6b and 6c) may be attached to the carriage other than the head holder 42.

All of the reflecting members 6a, 6b and 6c may not be provided to a single member, but may be dispersed to different members.

Furthermore, the embodiment takes, as an example, a case where the controller 31 of the printing device 1 includes the nail information detector 313 as the posture state detector that obtains the nail information from the nail image and all the processing is completed in the printing device 1. However, the method for confirming the nail posture is not limited to the method that is realized only by the printing device 1.

For example, the controller 81 of the terminal device 7 may have the nail information detector as the posture state detector so that the nail images (lateral images, front image) photographed by the photographing unit 50 of the printing device 1 are transmitted to the terminal device 7 and the controller 81 of the terminal device 7 detects the nail posture state.

In this case, the controller 81 of the terminal device 7 may also have a functional unit that generates the printing data.

In such a way, by the terminal device 7 performing the control operation other than the printing and photographing, it is possible to simplify the configuration of printing device 1.

The embodiment takes, as an example, a case where the nail images (lateral images, front image) are photographed by using the reflecting members 6 provided on the surfaces of the head holder 42. However, when the lateral images, front image and the like are obtained, the reflecting members may not be moved, but the photographing unit 50 and/or the finger holder 2 (finger stage) may be moved by a moving mechanism such as a motor not shown in the drawings. In this case, for example, it is sufficient that the photographing unit 50 and/or the finger holder 2 (finger stage) can be moved to the position capable of focusing on the finger U and nail T held (placed) on the finger holder 2 (finger stage) via the reflecting member 6 provided on the surface of the head holder 42. The photographing unit 50 and/or the finger holder 2 (finger stage) may be configured to be movable in arbitrary directions such as the X direction, Y direction and Z direction (direction orthogonal to the X and Y directions). At least one of the reflecting members 6, photographing unit 50 and finger holder 2 (finger stage) may be movable, or all of them may be configured to be movable. The moving mechanism thereof is controlled by the controller 31.

As for the correction of the posture state of the nail T, the correction may be performed for at least one of the height position of the nail T, the inclination in the longitudinal direction of the nail T, and the rotation of the nail T. In this case, it is sufficient that at least one of the reflecting members may be provided on the carriage.

Although several embodiments of the present disclosure have been described, the scope of the present disclosure is not limited to the above described embodiments and includes the scope of the present disclosure that is described in the claims and the equivalents thereof.

What is claimed is:

1. A printing device comprising:
    a finger stage on which a finger corresponding to a nail is placed, the nail being a printing target;
    a carriage which has at least one reflector; and
    a camera which obtains at least an image of the nail of the finger placed on the finger stage from an upper direction and an image of the nail of the finger reflected in the reflector.

2. The printing device according to claim 1, further comprising a driver which moves the carriage.

3. The printing device according to claim 2, wherein the driver moves the carriage in a first direction and a second direction.

4. The printing device according to claim 3, wherein the first direction is a lateral direction with respect to an inserting direction of the finger, and the second direction is the inserting direction of the finger.

5. The printing device according to claim 2, further comprising a print head which is attached to the carriage, wherein
    the driver moves the carriage together with the print head.

6. The printing device according to claim 3, wherein the camera obtains at least one of a lateral image from a lateral side of the nail of the finger and a front image from a tip side of the nail of the finger by the driver moving the carriage with the reflector in the first direction and the second direction.

7. The printing device according to claim 1, wherein the reflector is a mirror.

8. The printing device according to claim 1, further comprising a display, wherein
    the display displays an image obtained by the camera.

9. The printing device according to claim 1, further comprising at least one processor, wherein
    the processor detects a posture state of the nail based on an image obtained by the camera.

10. The printing device according to claim 9, further comprising a display, wherein
    the display displays notification to a user of the posture state of the nail based on the detected posture state of the nail.

11. The printing device according to claim 10, wherein the display displays notification to the user to correct the posture state of the nail in response to the detected posture state of the nail not being within an allowable range.

12. The printing device according to claim 9, wherein the posture state of the nail is at least one of a height position of the nail, an inclination of a longitudinal direction of the nail, and rotation around an axis of the finger corresponding to the nail.

13. A nail posture confirmation method comprising:
    obtaining, by at least one processor, an image of a finger placed on a finger stage through at least one reflector which a carriage has; and
    detecting, by the processor, a posture state of a nail of the finger based on the image.

14. The nail posture confirmation method according to claim 13, further comprising:
    obtaining, by the processor, at least one of a lateral image from a lateral side of the nail of the finger through the reflector and a front image from a tip side of the nail of the finger through the reflector.

15. The nail posture confirmation method according to claim 13, further comprising notifying, by the processor, a user of the posture state of the nail based on the detected posture state of the nail.

16. A non-transitory computer readable storage medium storing a program that causes a computer of a printing device, which includes a carriage that has at least one reflector and a camera that obtains at least an image of a nail of a finger placed on a finger stage from an upper direction and an image of the nail of the finger reflected in the reflector, to perform:
  moving the carriage; and
  detecting a posture state of the nail of the finger based on an image of the nail of the finger obtained by the camera.

* * * * *